United States Patent
Hayashi et al.

(10) Patent No.: US 6,306,289 B1
(45) Date of Patent: Oct. 23, 2001

(54) CATALYST FOR HYDROGENATION TREATMENT AND METHOD FOR HYDROGENATION TREATMENT OF HYDROCARBON OIL

(75) Inventors: Fumitaka Hayashi; Akira Kamo; Hiroshi Toshima, all of Saitama (JP)

(73) Assignee: Tonen Corporation, Tokyo (JP)

( * ) Notice: Subject to any disclaimer, the term of this patent is extended or adjusted under 35 U.S.C. 154(b) by 0 days.

(21) Appl. No.: 09/423,833

(22) PCT Filed: Mar. 16, 1999

(86) PCT No.: PCT/JP99/01288

§ 371 Date: Nov. 16, 1999

§ 102(e) Date: Nov. 16, 1999

(87) PCT Pub. No.: WO99/47256

PCT Pub. Date: Sep. 23, 1999

(30) Foreign Application Priority Data

| Mar. 16, 1998 | (JP) | 10-84902 |
| May 26, 1998 | (JP) | 10-161429 |
| Jun. 23, 1998 | (JP) | 10-192451 |

(51) Int. Cl.[7] ................................................ C10G 45/00
(52) U.S. Cl. ................................. 208/264; 208/216 PP; 208/254 H; 502/232; 502/235
(58) Field of Search ....................... 208/264, 216 PP, 208/254 H; 502/232, 235, 234; 585/260

(56) References Cited

U.S. PATENT DOCUMENTS 4,631,269  12/1986  Lachman et al. .
5,944,983  * 9/1999  Hayashi et al. .................. 208/264

FOREIGN PATENT DOCUMENTS

| 0197681 | 10/1986 | (EP) . |
| A61-242639 | 10/1986 | (JP) . |
| A62-287446 | 12/1986 | (JP) . |
| B2-331496 | 5/1991 | (JP) . |
| A6-127931 | 5/1994 | (JP) . |
| A8-89806 | 4/1996 | (JP) . |
| A9-118520 | 5/1997 | (JP) . |
| A9-255321 | 9/1997 | (JP) . |
| A9-276712 | 10/1997 | (JP) . |

* cited by examiner

*Primary Examiner*—Bekir L. Yildirim
(74) *Attorney, Agent, or Firm*—Birch, Stewart, Kolasch & Birch, LLP (57) ABSTRACT

A hydrotreating catalyst having both a high desulfurization activity and a denitrogenation activity and a method of hydrotreating a hydrocarbon oil using the same is provided.

A hydrotreatment catalyst comprising a silica-alumina carrier loaded with at least one hydrogenation-active component; wherein (1) the silica content is in the range of 2 to 40% by weight based on the total weight of the carrier; and (2) in the spectrum obtained by nuclear magnetic resonance analysis ($^{29}$Si-NMR), (i) the area of the peak at −80 ppm is 10% or more of the combined area of all the peaks; and (ii) the combined area of peaks at −80 ppm, −86 ppm and −92 ppm is 20% or more of the combined area of all peaks; a hydrotreating catalyst comprising a silica-alumina carrier containing a specific amount of a third component loaded with at lest one hydrogenation-active metal component and having a specific pore structure; and a method of hydrotreating a hydrocarbon oil comprising contacting a hydrocarbon oil with hydrogen in the presence of said hydrotreating catalyst.

22 Claims, 2 Drawing Sheets shift position from a reference position   ppm

CATALYST FOR HYDROGENATION TREATMENT AND METHOD FOR HYDROGENATION TREATMENT OF HYDROCARBON OIL

This application is the national phase under 35 U.S.C. §371 of PCT International Application No. PCT/JP99/01288 which has an International filing date of Mar. 16, 1999, which designated the United States of America.

FIELD OF THE INVENTION

The present invention relates to a hydrotreating catalyst and to a method of hydrotreating hydrocarbon oils using the same. More specifically, the present invention relates to a hydrotreating catalyst comprising a silica-alumina catalyst carrier in which the silica is highly dispersed or a silica-alumina carrier having a specific pore structure loaded with at least one type of hydrogenation-active metal component, and in particular, to one having a high degree of silica dispersion specified by nuclear magnetic resonance analysis; and to a method of hydrotreating hydrocarbon oils such as hydrodesulfurization, hydrodenitrogenation, hydrocracking, hydrodearomatization, hydroisomerization, and hydrofining using the same.

PRIOR ART

To date, there have been developed various hydrotreating catalysts for hydrotreating hydrocarbon oils in the process of producing petroleum products comprising a refractory inorganic oxide carrier such as alumina, silica-alumina, magnesia or zirconia loaded with oxides or sulfides of Group VI metals and Group VIII metals. These hydrotreating catalysts have been widely used, for example, in the hydrodesulfurization, hydrodenitrogenation, hydrocracking and hydrodearomatization of distallates and residual oils from the atmospheric or vacuum distillation of crude oils, the hydrofining of lubricating oil fractions, and the hydroisomerization of wax fractions.

However, there has been a demand in recent years from the viewpoint of environmental conservation for a further increase in desulfurization activity to meet the demand for more stringent hydrodesulfurization of hydrocarbon oils, together with a further increase in denitrogenation activity for the removal of nitrogen compounds in fuels which are seen as a source of nitrogen oxides which are substances which cause atmospheric pollution. Furthermore, when hydrocarbon oils which contain nitrogen compounds are subjected to catalytic cracking or catalytic reforming in the process of refining oils, there is a striking reduction in the activity of the cracking catalyst or reforming catalyst inviting a reduction in product yield, and there has therefore been a demand for increased denitrogenation activity to counter this problem.

Such a hydrotreating catalyst is disclosed, for example, in Japanese Patent Application Laid-open (Kokai) No. 287446/1986. It discloses a catalyst carrier composition having heat resistance and obtained by adding a basic compound to a mixed aqueous solution of an alumina hydrate and colloidal silica to convert the mixed aqueous solution into a viscous gel, followed by drying and calcinating the gel. In Japanese Patent Application Laid-open (Kokai) No. 242639/1986, there is disclosed a monolithic catalyst carrier comprising a structural layer of a sintered ceramic substance and a high surface area carrier layer of a porous oxide integrated with the structural layer. The porous oxide carrier layer of this catalyst has 50 to 93% by weight of alumina and 7 to 50% by weight of silica as its main components.

Furthermore, as proposals concentrating on the porous structure of the catalyst, there is disclosed, for example, in Japanese Patent Publication (Kokoku) No. 31496/1991 a hydrotreating catalyst comprising a silica-alumina carrier having a specific pore volume and a controlled distribution of pores in both the micropore and macropore regions, loaded with a hydrogenation-active component. In Japanese Patent Application Laid-open (Kokai) No.276712/1997, there is disclosed a catalyst comprising a carrier containing alumina, silica and magnesia loaded with Group VI and/or Group VIII metals, which has an average pore diameter of 190 to 350 Angstroms. In Japanese Patent Application Laid-open (Kokai) No.89806/1996, there is disclosed a hydrodesulfurization-denitrogenation catalyst comprising a carrier loaded with hydrogenation-active components, said carrier having a boria-silica-alumina base, having an average pore diameter of 60 to 90 Angstroms and in which the volume of pores having a pore diameter within ±10 Angstroms of the average pore diameter represents no less than 60% of the total pore volume.

However, each of the above-described proposed catalysts have the problem that their hydrogenation activity is still not sufficient. There is therefore the desire for the development of a hydrotreating catalyst which is improved with respect to desulfurization activity, denitrogenation activity, and with respect its performance at maintaining these activities.

DISCLOSURE OF THE INVENTION

An object of the present invention is to improve the above-mentioned problem areas of the prior art technology and to provide a hydrotreating catalyst which exhibits both high desulfurization activity and high denitrogenation activity and which is excellent with respect to its performance at maintaining these activities.

A second object of the present invention is to provide a hydrotreating catalyst which comprises a silica-alumina carrier in which the silica is highly dispersed and which has high desulfurization activity and high denitrogenation activity.

A third object of the present invention is to provide a hydrotreating catalyst in which hydrogenation-active metal components are highly dispersed on a carrier, and which is excellent with respect to both desulfurization activity and denitrogenation activity.

A fourth object of the present invention is to provide a method of hydrotreating to a high degree hydrocarbon oils containing sulfur and nitrogen compounds.

The inventors of the present invention have carried out extensive research regarding the relationship between the desulfurization activity and denitrogenation activity of a hydrotreating catalyst and the physical properties of its carrier. As a result, they found that when silica-alumina comprising a silica layer formed on an alumina surface is used as the carrier, the control of the solid acidity of the hydrotreating catalyst is facilitated, and that the increase in silicon-aluminum bonds and the uniform development of a number of solid acid sites having uniformly acidic properties on the alumina is facilitated; and that as a result both the sulfur compounds and nitrogen compounds in a hydrocarbon oil can be eliminated to a high degree by using a hydrotreating catalyst having as a structural component a silica-alumina carrier which contains a large amount of silica and in which the silica is highly dispersed or a silica-alumina-third component carrier comprising silica, alumina and a third component which has a high pore volume in the relatively small pore diameter regions and whose pore diameter distribution lies within a specific range. It was on the basis of these findings that the present invention was completed.

The present invention provides a hydrotreating catalyst comprising a carrier comprising silica and alumina loaded with at least one hydrogenation-active metal component, characterised in that:
(1) the silica content is in the range of 2% to 40% by weight based on the total weight of the catalyst carrier; and
(2) in the spectrum obtained by nuclear magnetic resonance analysis ($^{29}$Si-NMR),
  (i) the area of peaks at −80 ppm is 10% or more of the combined area of all the peaks, and
  (ii) the total area of peaks at −80 ppm, −86 ppm and −92 ppm is 20% or more of the combined area of all the peaks.

The present invention also relates to a hydrotreating catalyst comprising a carrier comprising silica and alumina and containing an alkaline earth metal oxide and/or boria as a third component, loaded with at least one hydrogenation-active metal component, wherein:
(1) the silica content is in the range of 2% to 40% by weight based on the total weight of the carrier;
(2) the content of the third component is in the range of 0.1 to 10% by weight based on the total weight of the carrier; and
(3) in the pore structure:
  (i) the ratio ((a)/(b)) of (a) the volume of pores having a pore diameter in the range of 30 to 100 Angstroms as measured by the nitrogen adsorption method and (b) the volume of pores having a pore diameter in the range of 0 to 150 Angstroms as measured by the nitrogen adsorption method is 0.5 or greater;
  (ii) the ratio (c)/(d) of (c) the volume of pores having a pore diameter in the range of 150 to 300 Angstroms as measured by the nitrogen adsorption method and (d) the volume of pores having a pore diameter in the range of 0 to 300 Angstroms as measured by the nitrogen adsorption method is 0.4 or less;
  (iii) the ratio (e)/(f) of (e) the volume of pores having a pore diameter in the range of 0 to 300 Angstroms as measured by the nitrogen adsorption method and (f) the volume of pores having a pore diameter of 40 Angstroms or greater as measured by mercury porosimetry is 0.7 or greater; and
  (iv) the specific surface area is 200 m$^2$/g or greater.

Furthermore, the present invention provides a method of hydrotreating a hydrocarbon oil comprising contacting a hydrocarbon oil with hydrogen under hydrotreating conditions and in the presence of the above-described hydrotreating catalyst.

EMBODIMENTS OF THE INVENTION

The present invention will hereinafter be described in detail.
(Hydrotreating Catalyst)

The hydrotreating catalyst of the present invention comprises a carrier comprising silica and alumina or a carrier comprising silica, alumina and a third component and a hydrogenation active metal component. Hydrotreating catalyst (I) and hydrotreating catalyst (II) are provided for achieving the above-described object of the present invention to provide both high desulfurization activity and high denitrogenation activity.

Hydrotreating Catalyst (I)

Hydrotreating catalyst (I) comprises a silica-alumina carrier having a structure in which a silica layer is formed on an alumina surface, loaded with at least one hydrogenation active metal component. It contains a large amount of silica, and it has a large number of silicon-aluminium bonds giving a uniform distribution on the alumina of a large number of solid acid sites having uniformly acidic properties.

The above-mentioned hydrogenation active metal component comprises at least one active component selected from the group consisting of the elements of Group VI and Group VIII of the Periodic Table, and preferably comprises at least one active component selected from the group consisting of the elements of Group VI of the Periodic Table and at least one active component from the group consisting of the elements of Group VIII of the Periodic Table.

The silica content in the silica-alumina carrier of hydrotreating catalyst (I) is in the range of 2 to 40% by weight, preferably in the range of 5 to 30% by weight based on the total weight of the carrier. If the silica content is less than 2% by weight, satisfactory solid acid properties cannot be obtained. On the other hand, if it exceeds 40% by weight, cracking of the hydrocarbon oil may be promoted under certain reaction conditions giving rise to the problem of the formation of lighter substances in the hydrotreated oil.

Furthermore, hydrotreating catalyst (I) is endowed with an excellent degree of silica dispersion as a result of producing the silica-alumina carrier by the method described hereinafter. The degree of silica dispersion is shown by the spectrum obtained by nuclear magnetic resonance analysis ($^{29}$Si-NMR); the area of the peak at −80 ppm is 10% or greater, preferably 12% or greater of the combined area of all the peaks, and the combined area of the peaks at −80 ppm, −86 ppm and −92 ppm is 20% or greater, preferably 25% or greater, of the combined area of all the peaks. If the proportion of the combined area of the peaks at −80 ppm, −86 ppm and −92 ppm is less than 20%, the silica is not dispersed in the alumina, whereby satisfactory solid acid properties and a satisfactory distribution of solid acid sites cannot be obtained. Furthermore, even if the proportion of the combined area of the peaks at −80 ppm, −86 ppm and −92 ppm is 20% or greater, if the area of the peak at −80 ppm is less than 10%, then it cannot be said that the silica is highly dispersed and the desired solid acid properties and distribution of solid acid sites cannot be obtained. Accordingly, such a hydrotreating catalyst would not possess excellent desulfuization activity and denitrogenation activity, and would also exhibit problems with respect to heat resistance.

Normally, the silicon (Si)-aluminium (Al) bonding in a silica-alumina carrier can be represented by the following formulae (i) to (iv):

(ii) ... (iii) ... (iv) ... (v)

According to $^{29}$Si-nuclear magnetic resonance analysis, the position of the signal representing the $^{29}$Si-nuclear magentic resonance absorption in such a silica-alumina carrier varies depending on the number of aluminiums to which the Si is bonded through oxygen atoms, and shifts by almost regular intervals towards the high frequency side as the number of aluminiums to which it is bonded increases. When a silica-alumina catalyst carrier is subjected to nuclear magnetic resonance analysis ($^{29}$Si-NMR analysis) using sodium 3-(trimethylsilyl)propanesulfonate as the reference material, a structure represented by the above formula (i) in which a single silicon is bonded to four aluminiums gives a peak position at −80 ppm, a structure represented by the above formula (ii) in which a single silicon is bonded to three aluminiums gives a peak position at −86 ppm, a structure represented by the above formula (iii) in which a single silicon is bonded to two aluminiums gives a peak position at −92 ppm, and a structure represented by the above formula (iv) in which a single silicon is bonded to one aluminium gives a peak position at −98 ppm. A structure represented by the above formula (v) in which there are no aluminium substituents gives a peak position at −104 ppm to −110 ppm. Accordingly, the degree of dispersion of silica in a silica-alumina carrier can be represented by the degree of bonding between Si and Al. Namely, it can be defined as follows: the higher the number of aluminiums bonded to silicon, i.e. the more the spectrum obtained by nuclear magnetic resonance lies towards the high frequency side, the higher the degree of silica dispersion. Even with the above-described silica-alumina carrier containing a third component, there is observed no substantial change with respect to retention of the degree of silica dispersion.

The hydrotreating catalyst (I) of the present invention is one in which the degree of silica dispersion is specified according to the number of aluminiums to which the silicon is bonded; the proportion of the area of the peak at −80 ppm with respect to the area of all peaks (area of the composite spectrum, i.e. combined area of 6 peaks) obtained by $^{29}$Si-nuclear magentic resonance analysis is 10% or greater, and the proportion of the combined area of the peaks at −80 ppm, −86 ppm and −92 ppm with respect to the area of all peaks is 20% or greater.

For the carrier, it is preferred that the proportion of the area of the peak at −80 ppm with respect to the area of all peaks obtained by $^{29}$Si-nuclear magnetic resonance analysis is 10% or greater, and that the proportion of the combined area of peaks at −80 ppm, −86 ppm, −92 ppm with respect to the area of all peaks is 51% or greater.

Figure 1:
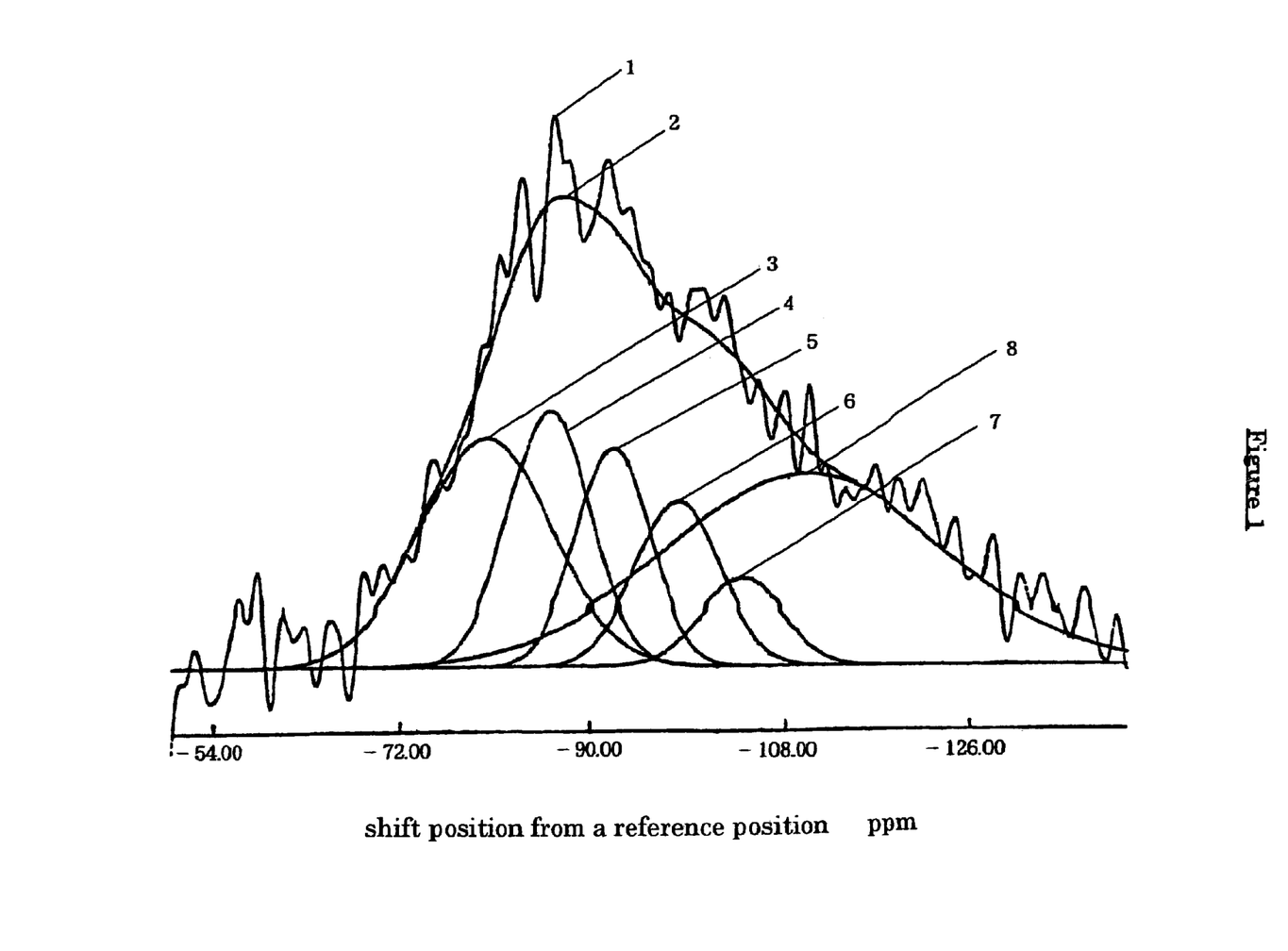
FIG. 1 shows an example of a spectrum obtained by the $^{29}$Si-nuclear magnetic resonance analysis of a hydrotreating catalyst according to the present invention.

FIG. 1 shows an example of a spectrum obtained by $^{29}$Si-nuclear magnetic resonance analysis of hydrotreating catalyst (I) after the silica-alumina carrier has been loaded withh hydrogenation-active components. The horizontal axis represents a value showing the shift from the signal of the reference material, and the vertical axis represents the relative absorption strength. In FIG. 1, curve 1 is the actually measured spectrum, and curve 2 is a composite spectrum of the 6 peaks (peaks 3 to 8) obtained from the actually measured spectrum by waveform deconvolution by least square adjustment method using a Gaussian function curve. Peaks 3 to 6 correspond to the structures represented by the above formulae (i) to (iv), respectively; and peaks 7 and 8 correspond to the structure represented by the above formula (v). Accordingly, the proportion of structures represented by formulae (i) to (iv) with respect to the total structures of a hydrotreating catalyst having, for example, a silica-alumina carrier can be calculated from the proportion of the combined area of peaks 3 to 6 with respect to the area of the composite spectrum (region surrounded by curve 2 and the base line).

Figure 2:
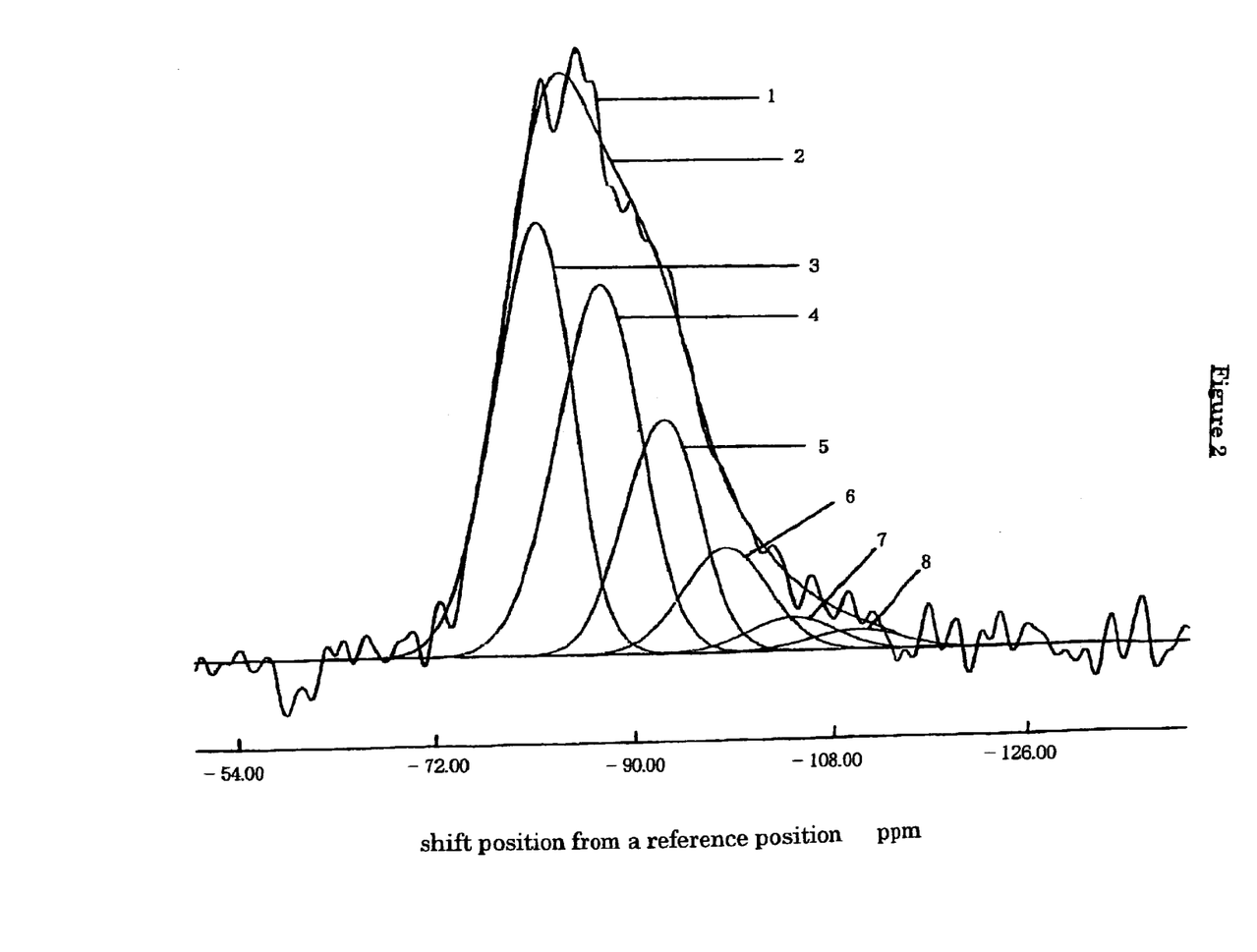
FIG. 2 shows an example of a spectrum obtained by the $^{29}$Si-nuclear magnetic resonance analysis of a carrier of a hydrotreating catalyst according to the present invention.

FIG. 2 is an example of a spectrum obtained by the $^{29}$Si-nuclear magnetic resonance analysis of a silica-alumina carrier composing a hydrotreating catalyst. Curve 1 is an actually measured spectrum, and curve 2 is a composite spectrum of the six peaks (peaks 3 to 8) obtained from the actually measured spectrum in the same way as the above-described catalyst spectrum. Peaks 3 to 6 correspond to the structures represented by the above formulae (i) to (iv), respectively, and peaks 7 and 8 correspond to the above formula (v). The proportion of structures represented by formulae (i) to (iv) with respect to the total structures of the silica-alumina carrier can be calculated from the proportion of the combined area of peaks 3 to 6 with respect to the area of the composite spectrum.

The $^{29}$Si-nuclear magnetic resonance analysis can be carried out under the followng conditions:

(1) Nuclear magnetic resonance apparatus: DSX-400 made by Bruker.
(2) Measurement Nucleus: $^{29}$Si
(3) Measurement Mode: High Power Decoupling/Magic Angle Spinning Method
(4) Excitation Pulse Slip Angle: 30 to 45 degrees
(5) Waiting Time: 40 seconds or longer
(6) Sample Revolutions: 7 KHz
(7) Window Processing: Exponential Function (Coefficient 50 Hz)
(8) Sample Pre-treatment: None
(9) Reference Material: Sodium 3-(trimethylsilyl) propane-sulfonate [$(CH_3)_3SiC_3H_6SO_3Na$] having a peak position at 1.46 ppm.
(10) Peak Area: Area of the peak obtained by waveform deconvolution from the actually measured spectrum.
(11) Waveform deconvolution: waveform deconvolution of 6 peaks by least squares adjustment method using a Gausian function curve.

The peak position and full width at half maximum of each peak is shown in the table below. The full width at half maximum of the peaks at −80.0 ppm and −110.0 ppm is the optimum value when the composite spectrum determined from the 6 peaks best fits the actually measured spectrum.

| Peak Position (ppm) | Full Width at Half Maximum |
|---|---|
| −80.00 | Optimum value obtained by calculation |
| −86.00 | 9.00 |
| −92.00 | 8.00 |
| −98.00 | 9.00 |
| −104.00 | 9.00 |
| −110.00 | Optimum value obtained by calculation |

In the silica-alumina carrier of the hydrotreating catalyst (I), solid acid sites are generated as a result of silicon and aluminium bonding through an oxygen atom, and it is hypothesised that the degree of this bonding between silicon and aluminium (i.e. the degree of silica dispersion) has an affect on the solid acid properties of the silica-alumina carrier and that these solid acid properties contribute to highly dispersed loading of the hydrogenation-active metal components in the hydrotreating catalyst giving highly active sites.

The silica-alumina carrier of hydrotreating catalyst (I) may also contain in addition to silica and alumina a third component such as an alkaline earth metal oxide, boria, titania, zirconia, hafnia and thoria. The incorporation of such third components makes it easy to increase and control the acidity and obtain a catalyst carrier of yet higher activity. Typically, the content of the third component is in the range of 0.1 to 10% by weight, preferably 0.5 to 7% by weight in terms of the oxide and based on the total weight of the carrier after calcination.

The silica-alumina carrier of hydrotreating catalyst (I) can be prepared using the following methods. It can be prepared by (1) a method in which a silica hydrate gel and an alumina hydrate gel are each prepared in advance and then mixed together; (2) a method in which an appropriate amount of a basic substance or an acidic substance is added to a uniformly mixed solution of a water-soluble aluminium compound and a water-soluble silicon compound to co-precipitate both; (3) a method in which a silica hydrate gel is immersed in a solution of an aluminium compound followed by addition of an appropriate amount of a basic substance or an acidic substance to precipitate an alumina hydrate gel on the silica hydrate gel; or (4) a method in which an alumina hydrate gel is immersed in a solution of a silicon compound followed by addition of an appropriate amount of a basic substance or an acidic substance to precipitate a silica hydrate gel on the alumina hydrate gel.

In the case that a third component is incorporated into the silica and alumina, this can be done, for example, by adding in advance the desired amount of a hydrate gel of the third component to the silica hydrate gel or the alumina hydrate gel or by impregnating the silica-alumina with the desired amount of a water-soluble compound of the third component.

Silicon compounds such as alkali metal silicates ($Na_2O:SiO_2$=1:2 to 1:4 is preferred), tetraalkoxysilanes, silicon tetrachloride, and orthosilicate esters can be used as starting materials for the silica. Aluminium compounds such as sulfates, chlorides and nitrates of aluminium, alkali metal aluminates, aluminium alkoxides and other inorganic and organic salts can be used as the starting material for the alumina.

As a starting material for the third component, water-soluble compounds such as nitrates, halides, halates, sulfates and carbonates can be used in the case of alkaline earth metal oxides, and boric acid and tetraboric acid as well as boron alkoxides such as boron trimethoxide, boron triethoxide can be used in the case of boria. In the case of titania, starting materials include water-soluble compounds such as the sulfide, the chloride, and titanium alkoxides such as titanium tetraethoxide and titanium triisopropoxide.

In the preparation of the above-described silica-alumina carriers, it is important to control the reactivity of the alumina and the silica by adjusting the rate at which the silica hydrate gel is precipitated on to the alumina hydrate gel and the ratio of the amount of alumina and silica. By controlling the precipitation rate, the bonding between the silica and aluminium is mainly as represented by the above formulae (i) to (iii), whereby the silica can be highly dispersed. A controlled rate of addition of the aqueous solution of a silicon compound will vary depending on other reaction conditions, but in the case of an aqueous solution of an aluminium compound of about 0.1 moles to about 4 moles, and an aqueous solution of a silicon compound of about 0.1 moles to about 10 moles, it is preferable to set the addition rate to 10 ml per minute or less. Under non-controlled conditions, there is no bonding between the silica and alumina resulting in a silica polymer corresponding to the above formula (v), and a satisfactory alumina-silica carrier cannot be obtained. Furthermore, by adjusting the ratio of the amount of silica and alumina, it is possible to incorporate silica in large amounts.

In more specific detail, the carrier can be prepared in the following way. First, an acidic or alkaline aqueous solution is added gradually to an aqueous solution of a starting aluminium compound to adjust the pH of the liquid mixture to between 7 and 11, preferably 8 and 10, over a period of about 5 to about 30 minutes. This is followed by aging at a temperature of about 70° C. for 0.2 to 1.5 hours to produce an alumina hydrate gel. Next, an aqueous solution of a silicon compound is added such that the silica content in the silica-carrier after calcination is in the range of 2 to 40% by weight in terms of $SiO_2$. Where necessary, this is carried out whilst controlling the pH to within about 7 to 11 by the addition of an acidic aqueous solution such as nitric acid. It is then maintained at a temperature of about 50 to about 80° C. for at least 0.2 hours to form a layer of silica on the alumina hydrate gel core by precipitation of a silica hydrate gel, thus producing a silica-alumina carrier. When the aqueous solution of an aluminium compound is, for example, an aqueous solution of sodium aluminate, the concentration should be in the range of about 0.1 moles to about 4.0 moles. When the aqueous solution of a silicon compound is, for example, an alkali metal silicate ($Na_2O:SiO_2$=1:2 to 1:4 is preferred), the concentration should be in the range of about 0.1 moles to about 10 moles.

Next, the precipitate containing the silica-alumina carrier is filtered off and washed with water or an ammonium carbonate solution to remove impurity ions in the precipitate, thus preparing a cake-shaped silica-alumina carrier which is thereafter moulded into the desired shape using a moulding apparatus. Finally, the moulded product is subjected to drying and calcination treatments. The drying is carried out by heating in the presence or absence of oxygen at a temperature between normal temperature and about 200° C. The calcination is carried out by heating in the presence of oxygen to a temperature in the range of about 200 to about 800° C., preferably about 600 to about 700° C.

Hydrotreating Catalyst (II)

Next, hydrotreating catalyst (II) shall be described. Hydrotreating catalyst (II) comprises a catalyst carrier consisting of silica, alumina and a third component containing a specific amount of an alkaline earth metal oxide and/or boria, loaded with at least one type of hydrogenation-active metal component, and has a specific pore structure. The third component preferably comprises an alkaline earth metal oxide and boria, but it is also possible to add at least one type of metal oxide selected from the group consisting of alkali metal oxides, zirconia, titania, thoria and phosphorous oxide.

The carrier of hydrotreating catalyst (II) of the present invention has a silica-alumina base in which the third component is incorporated. Namely, silica and the third component are dispersed on an alumina core, and it includes structure in which at least two or more of silicon, aluminium and the third component are bonded to each other via oxygen atoms. Silicon compounds such as alkali metal silicates ($Na_2O:SiO_2$=1:2 to 1:4 is preferred), tetraalkoxy silanes, silicon tetrachloride and orthosilicates can be used as the silica starting material; and aluminium compounds such as aluminium sulfate, aluminium chloride, aluminium nitrate, alkali metal aluminates, aluminium alkoxides and other inorganc and organic salts can be used as the alumina starting material. These aluminium compounds and silicon compounds may be used as aqueous solutions and water-soluble sol or gel mixtures. There are no particular limitations with respect to the concentration thereof which may be determined appropriately. Examples of starting materials for alkaline earth metal oxides as the third component are water-soluble salts of alkaline earth metals such as chlorides, nitrates, carbonates and hydroxides. Examples of alkaline earth metal elements include magnesium, calcium, strontium and barium, with magnesium being preferred. Examples of starting materials for boria as the third component include boric acid, ammonium borate and boron alkoxides. The same starting materials for producing the carrier as used for the above-described hydrotreating catalyst (I) provided they do not create problems.

In the silica-alumina carrier, the incorporation of silica into the alumina gives the carrier relatively strong acid sites, and the solid acidity of the carrier is preferably controlled according to the silica content. Alkaline earth metal oxides themselves possess basic properties but by forming a mixed composition with the silica-alumina, they can exhibit acid-base properties. As a result, the number of strong acid sites possessed by the silica-alumina composition can be reduced whilst at the same time increasing the number of weak acid sites without largely reducing the acidity of the carrier, whereby the carrier can be provided with a specific acid strength (medium/weak acid). Furthermore, in the case of a silica-alumina-boria carrier, the boria component increases the number of weak acid sites whilst reducing the number of strong acid sites possessed by the silica-alumina carrier component, whereby the carrier can be provided with a specific acid strength. This can thus contribute to an improvement in the activity and selectivity of the carrier as well as its performance at maintaining the activity.

The content of silica in the carrier is in the range of 2 to 40% by weight, preferably 2 to 20% by weight based on the total weight of the carrier. If the silica content exceeds 40% by weight, cracking of the hydrocarbon oil is promoted with the problem of formation of lighter substances in the hydrotreated oil. The content of the third component such as alkaline earth metal oxides and boria is in the range of 0.1 to 10% by weight, preferably 0.5 to 7% by weight based on the total weight of the carrier. If the content of the third component exceeds 10% by weight, there is the problem of a reduction in the hydrotreating activity.

It is important that the hydrotreating catalyst (II) of the present invention has a specific pore structure in addition to the above-described composition. It has the following pore characteristics (i) to (i):

Firstly, (i) the ratio (a)/(b) of (a) the volume of pores having a pore diameter in the range of 30 to 100 Angstroms as measured by the nitrogen adsorption method and (b) the volume of pores having a pore diameter in the range of 0 to 150 Angstroms as measured by the nitrogen adsorption method is 0.5 or greater.

This characteristic is represented by the following equation (1):

$$PV_{(30-100)}/PV_{(0-150)} \geq 0.5 \quad (1)$$

Secondly, (ii) the ratio (c)/(d) of (c) the volume of pores having a pore diameter in the range of 150 to 300 Angstroms as measured by the nitrogen adsorption method and (d) the volume of pores having a pore diameter as in the range of 0 to 300 Angstroms measured by the nitrogen adsorption method is 0.4 or less; this is represented by the following equation (2):

$$PV_{(150-300)}/PV_{(0-300)} \leq 0.4 \quad (2)$$

The first and second pore characteristics lie in a well-balanced increase in the pore volume occupied by pores having a diameter in the range of 30 to 100 Angstroms as measured by the nitrogen adsorption method, and the pore volume occupied by pores having a diameter measurd by the nitrogen adsorption method to be in the range of 100 to 150 Angstroms; if X is the pore volume ratio ($PV_{(30-100)}/PV_{(0-150)}$) and Y is the pore volume ratio ($PV_{(150-300)}/PV_{(0-300)}$), then X is 0.5 or greater, preferably 0.6 to 0.8, and Y is 0.4 or less, preferably 0.3 or less. In this respect, $PV_{(n-m)}$ means the pore volume occupied by pores having a pore diameter between n and m. For example, $PV_{(30-100)}$ is the pore volume occupied by pores having a pore diameter in the range of 30 to 100 Angstroms. If X is less than 0.5 or Y exceeds 0.4, the desulfurization activity and denitrogenation activity are reduced.

Thirdly, the ratio (e)/(f) of (e) the volume of pores having a pore diameter is in the range of 0 to 300 Angstroms measured by the nitrogen adsorption method, and (f) the volume of pores having a pore diameter of 40 Angstroms or greater as measured by mercury porosimetry 0.7 or greater. This is represented by formula (3):

$$PV_{(30-100)}(\text{nitrogen adsorption method})/PV_{(\geq 40)}(\text{mercury porosimetry}) \geq 0.7 \quad (3)$$

It is preferably 0.8 or greater. If it is less than 0.7, the desulfurization activity and denitrogenation activity are reduced.

Furthermore, the specific surface area is 200 $m^2/g$ or greater. If it is less than 200 $m^2/g$, the hydrogenation-active metal components cannot be loaded on the carrier with a high degree of dispersion whereby it is not possible to obtain a high catalytic activity.

The silica-alumina-third component carrier of hydrotreating catalyst (II) can be prepared by producing a silica-alumina carrier component and then adding a water-soluble salt of an alkaline earth metal compound or a boron compound as the third component. The silica-alumina carrier component is typically produced according to one of the afore-mentioned methods (1) to (4), but in order to realise the above-described peculiar pore structure, it is required, when setting the pH by adding an acidic or alkaline aqueous solution to an aqueous solution of the starting aluminium compound at the time of preparing the alumina hydrate gel, to control the pH setting and required time to specific values. In particular, it is preferable to control the addition rate of the aqueous solution of the silicon compound to 10 ml per minute or greater for an aqueous solution of the aluminium compound of about 0.1 moles to about 4 moles, and an aqueous solution of the silicon compound of about 0.1 moles to 10 moles.

An example of a specific method of preparing a silica-alumina-alkaline earth metal oxide carrier is as follows. An acidic or alkaline aqueous solution is added gradually to an aqueous solution of the starting aluminium compound to adjust the pH of the mixed solution to between 7 and 11, preferably between 8 and 10, over a period of about 5 minutes to about 30 minutes to precipitate an alumina hydrate gel. The alumina hydrate gel thus precipitated whilst maintaining the pH at the above-mentioned set value is then aged at a temperature of about 70° C. for 0.2 to 1.5 hours. An aqueous solution of the silicon compound was then added at the afore-mentioned rate such that the silica-alumina-alkaline earth metal oxide carrier after calcination contains 2 to 40% by weight of $SiO_2$. It is then maintained at a temperature of about 50° C. to about 80° C. for 0.2 hours or more to form a silica layer on the alumina hydrate gel core by precipitation of a silica hydrate gel, whereby the silica-alumina carrier component is produced. Where necessary, the pH is adjusted at this time to within the range of about 7 to about 11 by the addition of an acidic aqueous solution.

Next, the precipiate containing the above-described silica-alumina carrier component is filtered off and washed with water or an ammonium carbonate solution to remove impure ions in the precipitate, and prepare a cake-shaped silica-alumina carrier. To this cake is added an aqueous solution of an alkaline earth metal salt such that the silica-alumina-alkaline earth metal oxide carrier contains 0.1 to 10% by weight of the alkaline earth metal oxide. This is followed by kneading and moulding into the desired shape using a moulding apparatus. Finally, the moulded product is subjected to drying and calcination treatments. The drying is carried out by heating to between normal temperature and about 200 ° C. in the presence or absence of oxygen, and calcination is carried out by heating to between 200 and 800° C., preferably to between 600° C. and 700° C., in the presence of oxygen. By producing the silica-alumina-alkaline earth metal oxide carrier under the above conditions, it is possible to obtain a carrier with a controlled pore distribution, whilst at the same time forming satisfactory bonds between the alkaline earth metal oxide, silica and alumina.

A silica-alumina-boria carrier can be prepared by preparing a silica-alumina carrier component in the same manner as for the silica-alumina-alkaline earth metal oxide carrier, and then adding a water-soluble salt of a boron compound. More specifically, the silica-alumina-boria carrier can be prepared in the same way as the silica-alumina-alkaline earth metal oxide carrier using a silica-alumina carrier component identical to the one used in the production of the above-described silica-alumina-alkaline earth metal oxide, except that boron compound is used instead of an alkaline earth metal compound.

The hydrotreating catalysts (I) and (II) of the present invention are both prepared by loading onto a silica-alumina based catalyst carrier respectively produced in the manners described above at least one hydrogenation-active metal component, specifically at least one hydrogenation-active metal component selected from the group consisting of the elements of Group VI and Group VIII of the Periodic Table. These elements are preferably loaded as their oxides and/or sulfides. Sulfides can be prepared by pre-sulfiding of the catalyst as will be described later.

Examples of Group VI elements of the Periodic Table for the hydrogenation-active metal component include chromium (Cr), molybdenum (Mo), and tungsten (W). Molybdenum or tungsten are preferred. Examples of Group VIII elements of the Periodic Table include iron (Fe), cobalt (Co), nickel (Ni), ruthenium (Ru), rhodium (Rh), palladium (Pd), osmium (Os), iridium (Ir) or platinum (Pt). Cobalt, nickel, ruthenium, rhodium, palladium, iridium or platinum are preferred. These elements can be used singularly or in mixtures thereof.

The hydrotreating catalyst of the present invention is prepared by loading the above-described hydrogenation-active metal components on to a silica-alumina based carrier. In particular, combinations of Group VI elements and Group VIII elements are preferred such as, for example, molybdenum-cobalt, molybdenum-nickel, tungsten-nickel, molybdenum-cobalt-nickel, tungsten-cobalt-nickel or molybdenum-tungsten-cobalt-nickel. Molybdenum-cobalt, molybdenum-nickel and molybdenum-cobalt-nickel are particularly preferred. Furthermore, in addition to these elements, it is also possible to add elements of Group VII of the Periodic Table such as manganese, elements of Group IV of the Periodic Table such as germanium, tin, and lead, elements of Group III of the Periodic Table such as boron, scandium and ittrium and elements of Group II of the Periodic Table such as zinc, to the extent that they do not harm the performance of the hydrotreating catalyst of the present invention.

The amount of the above-described Group VI elements loaded on the carrier is in the range of 10 to 40% by weight, preferably 12 to 30% by weight in terms of the oxide. If the loaded amount is less than 10% by weight, the number of active sites is small making it impossible to achieve a high desulfurization activity and denitrogenation activity, whereby the objective of the hydrotreatment such as hydrodearomatization or hydrofining can not be sufficiently realised. If the amount exceeds 40% by weight, it becomes impossible to load the hydrogenation-active metal components on the silica-alumina carrier with a high degree of dispersion, and at the same time there is no exhibition of the co-catalytic effect with respect to the Group VIII elements causing a reduction in the number of active sites. High desulfurization activity and high denitrogenation cannot then be obtained, with the problem that the hydrotreatment such as hydrodearomatization or hydrofining cannot be adequately carried out.

The amount of the above-described Group VIII elements loaded on the carrier is in the range of 0.05 to 15% by weight, preferably in the range of 0.1 to 10% by weight in terms of the oxide. If the loaded amount is less than 0.05% by weight, an adequate desulfurization activity and denitrogenation activity cannot be achieved, whereby the effect of the hydrotreatment such as hydrodearomatization or hydrofining cannot be adequately realised. On the other hand, if the amount exceeds 15% by weight, there is an increase in the number of metal components which do not bond with the silica-alumina carrier whereby inactive composite oxides are generated with the Group VI elements. As a result, there is the problem of a reduction in the degree of dispersion of the Group VI metals causing a reduction in the catalytic activity. It is thus impossible to obtain a high desulfurization activity and denitrogenation activity which hinders the hydrotreatment such as hydrodearomatization or hydrofining.

There are no particular limitations regarding the method of loading the hydrogenation-active components on to the silica-alumina based catalyst carrier which composes the hydrotreating catalyst of the present invention, and any known method can be employed. For example, they can be loaded in the following way. An impregnating solution is prepared by dissolving compounds of the hydrogenation-active metal components such as nitrates, acetates, carbonates, formates, ammonium salts, phosphates, or oxides in a solvent. An organic acid such as citric acid, tartaric acid, malic acid, acetic acid or oxalic acid is then added to this impregnating solution, and ammonium water is used to adjust the pH to about 9. The impregnating solution which has had its pH adjusted to about 9 is then added dropwise to the silica-alumina catalyst carrier whilst stirring to impregnate the carrier.

There are no particular limitations regarding the solvent. Various types can be used such as, for example, water, ammonium water, alcohols, ethers, ketones and aromatics. Preferred solvents are water, ammonium water, acetone, methanol, n-propanol, i-propanol, n-butanol, i-butanol, hexanol, benzene, toluene, xylene, diethylether, tetrahydrofuran and dioxane, with water being particularly preferred.

There are no particular limitations regarding the mixing ratio of the solvent and the hydrogenation-active metal components in the impregnating solution, or the amount of impregnating solution with which the silica-alumina carrier is impregnated. In view of the simplicity of the impregnation operation and drying-calcination operations. it is possible to select values which give the desired value for the amount of hydrogenation-active components on the catalyst after calcination.

The method of loading the hydrogenation-active metal components is as described above. In more detail, it is possible to adopt, for example, an impregnation method in which the carrier is immersed in a solution of a soluble salt of the hydrogenation-active metal component to incorporate the hydrogenation-active metal component into the carrier, or a co-precipitation method in which the hydrogenation-active metal component is simultaneously precipitated when producing the carrier; or any other method may be used. However, from the standpoint of ease of operation, it is preferred to use the impregnation method which is good for stabilising and maintaining the physical properties of the catalyst.

The impregnation operation involves immersed the silica-alumina based catalyst carrier in an impregnating solution at or above normal temperature, and then keeping it under conditions under which the desired hydrogenation-active metal components sufficiently impregnate the carrier. The temperature and amount of impregnating solution can be set appropriately such that the desired amount of hydrogenation-active metal component is loaded onto the carrier. Also, the amount of carrier to be immersed in the impregnating solution can be determined according to the desired amount of hydrogenation-active metal component to be loaded. Furthermore, where necessary, it is also possible to load other metals such as the above-mentioned Group VII and Group IV metals.

When impregnating two or more types of hydrogenation-active metal components on to the carrier, either of the following methods (1) and (2) can be arbitrarily adopted: (1) advance mixing of two or more types of hydrogenation-active metal components followed by simultaneous impregnation from a solution of such a mixture (one step impregnation method); (2) preparing separate solutions of two or more types of hydrogenation-active metal components followed by consecutive impregnation (two step impregnation method). However, the hydrotreating catalyst of the present invention is preferably produced by first loading a Group VIII element on the above-described carrier (first step) followed by loading of a Group VI element (second step).

Finally, the carrier which has been impregnated with hydrogenation-active metal components is moulded by, for example, tablet making, extrusion or rotational granulation, followed by drying using a method such as blow drying, hot air drying, heat drying or freeze drying, and calcination. There are no particular limitations regarding the calcination, but it is desirable to carry it out at a temperature in the range of 400 to 700° C. for about 1 to 5 hours. If the calcination temperature is too high, crystals of the oxides of the loaded hydrogenation-active metal components start to form, whereby the surface area and pore volume are reduced causing a reduction in its activity as a catalyst. On the other hand, if the temperature is too low, ammonium, acetate ions etc. contained in the loaded hydrogenation-active metal components are not released whereby sufficient active sites do not appear on the surface of the catalyst causing a reduction in activity. It is therefore desirable to carry out the calcination gradually.

(Method of Hydrotreating a Hydrocarbon Oil)

Next, a method of hydrotreating a hydrocarbon oil using the hydrotreating catalyst of the present invention shall be described. There are no particular limitations regarding the hydrocarbon oil which is subjected to hydrotreatment. For example, distillates and residual oils obtained from the atmospheric or vacuum distillation of crude oil, cracked gas oil fractions or mixtures thereof can be used. Particularly suitable are vacuum gas oils, cracked gas oils and straight run gas oils for which simultaneous desulfurization and denitrogenation is difficult.

Vacuum gas oils are obtained by the further vacuum distillation of residual oils from atmospheric distillation and are distillates having a boiling point in the range of about 370 to about 600° C. Some contain a fair amount of sulfur, nitrogen and metals (for example, sulfur content of 2.0% by weight and a nitrogen content of 800 weight ppm). The sulfur content includes sulfur compounds such as 4-methyldibenzothiophene, 4,6-dimethyldibenzothiophene; the nitrogen content includes basic nitrogen compounds such as pyridines, amines, amides etc. and weakly basic nitrogen compounds such as pyroles etc . . . The metal content includes nickel, vanadium, iron etc . . . The desulfurization and denitrogenation of these kinds of vacuum gas oils can be carried out most effectively according to the hydrotreating method of the present invention.

Cracked gas oils include gas oil fractions having a boiling point of about 200° C. or higher obtained by the thermal cracking of residual oils with coker or a visbreaker; and light cycle gas oils (LCGO) and heavy cycle gas oils (HCGO) obtained from a catalytic cracking apparatus.

There are no particular limitations regarding the reaction conditions of the hydrotreatment. They can be selected according to such factors as the type of hydrocarbon oil and the desired degree of desulfurization and denitrogenation. The following conditions can be adopted: reaction temperature in the range of 200 to 500° C., preferably 280 to 420° C.; reaction pressure in the range of 1 to 200 $kg/cm^2$; hydrogen-containing gas rate in the range of 100 to 270 l/l; and a liquid hourly space velocity in the range of 0.05 to 5.0 V/H/V, preferably 0.5 to 4 V/H/V. Preferred conditions include for example a reaction temperature of 370° C., a reaction pressure of 60 $kg/cm^2$, a hydrogen-containing gas rate of 214 l/l (1200SCF/B) and a liquid hourly space velocity of 1.0 V/H/V. A gas having a hydrogen concentration in the range of 60 to 100% can be used as the hydrogen-containing gas. Since the desulfurization activity, the denitrogenation activity, and the activity maintenance of the hydrotreating catalyst of the present invention are high, high desulfurization and denitrogenation rate can be achieved over a long period of time even under highly severe reaction conditions, in particular, low reaction pressures, at which the activity deterioration is high.

When carrying out hydrotreatment of a hydrocarbon oil, the hydrotreating catalyst can be used in the form of a fixed bed, a fluidized bed, a boiling bed or a moving bed. From the viewpoint of apparatus and operation, it is typically preferred to adopt a fixed bed. High desulfurization and denitrogenation rates can be achieved by carrying out the hydrotreatment with a combination of a plurality of two or more reactors. It is particularly preferred to use a multi-stage reactor when the hydrocarbon oil is a heavy oil.

In the hydrotreating method of the present invention, it is preferred to carry out a pre-sulfiding of the hydrotreating catalyst before the hydrotreatment of the hydrocarbon oil. The pre-sulfiding is carried out by packing the calcined catalyst into a reactor; supplying a sulfur-containing distillate to the reactor; contacting the catalyst with the distillate under reaction conditions comprising a temperature of 150 to 400° C., a pressure (total pressure) of 20 to 100 kg/cm², a liquid hourly space velocity of 0.3 to 2.0 V/H/V and a hydrogen-containing gas rate of 50 to 1500 l/l to sulfurize the active components. The sulfur-containing distillate is then switched for the starting hydrocarbon oil, the operation conditions for desulfurization and denitrogenation of the starting hydrocarbon oil are set, and then the hydrotreatment is commenced. Other methods than the one described above can be used for the sulfiding treatment such as directly contactig the catalyst with hydrogen sulfide or other sulfur compounds, or adding an appropriate amount of hydrogen sulfide or other sulfur compounds to a hydrocarbon oil and then contacting it with the catalyst.

EXAMPLES

The present invention shall now be described in detail on the basis of inventive examples and comparative examples. The present invention is not intended to be limited in any way by the examples.

The methods for measuring the physical properties (specific surface area, pore volume) of the catalysts prepared in the inventive and comparative examples, the $^{29}$Si-nuclear magnetic resonance analysis method, and the method of evaluating the activity of the catalysts are as follows:

(1) Specific surface area: measured according to the nitrogen adsorption method (BET method);
(2) Pore volume: measured according to the nitrogen adsorption method (BJH method) and mercury porosimetry method; the nitrogen adsorption method and mercury porosimetry method are described in P. H. Emmett et al, "Catalysis", Vol. 1, p.123 (1959) (Rheinhold Publishing Co.) and Shokubai Kogaku Koza, Vol. 4, p.69–78 (1964) (published by Chijin Shokan).

Various methods have been proposed for correcting the nitrogen adsorption method for multi-molecule layer adsorption. However, the data relating to pore volume in the present invention was calculated according to the BJH method using adsorption measurements of the adsorption isotherm. The BJH method is described in J. of Amer. Chem. Soc., Vol. 73, p.373 (1951), E. P. Barrett, L. G. Joyner and P. P. Halenda.

With respect to the mercury polosimetry, the contact angle of the mercury with respect to the catalyst was set to 130°, the surface tension was set to 485 Dyne/cm, and it was assumed that all the pores were cylindrical in shape.

(3) $^{29}$Si-nuclear measurement analysis: according to the method described above.
(4) Catalytic Activity Evaluation: a vacuum gas oil A and a vacuum gas oil B obtained from Middle-East crude oil were used as the sample oil. The properties of each sample oil are shown in Table 1.

TABLE 1

| Sample oil type | A | B |
| --- | --- | --- |
| Sample oil properties | | |
| Density (g/ml @ 15° C.) | 0.922 | 0.918 |
| Sulfur content (ppm) | 20000 | 18500 |
| Nitrogen content (ppm) | 800 | 785 |
| Reaction Conditions | | |
| Temperature (° C.) | 370 | 370 |
| Pressure (kg/cm²) | 60 | 60 |
| Hydrogen gas/Sample oil ratio (SCF/B) | 1200 | 1405 |
| Liquid Hourly Space Velocity (V/H/V) | 1.0 | 1.0 |
| Product oil properties | | |
| Sulfur content (ppm) | 500–2500 | 500–2500 |
| Nitrogen content (ppm) | 200–500 | 200–500 |

(ii) Hydrotreatment Test Method

The hydrotreatment test was carried out using a fixed bed flow-type reaction apparatus. First, the catalyst was packed into the reactor. A pre-sulfided oil prepared by incorporating 3% by volume of carbon disulfide ($CS_2$) into a sample oil was then flowed through the reactor for 40 hours to pre-sulfize the catalyst. Next, the sample oil was flowed through the reactor for about 24 hours to obtain a product oil in a state of reaction equilibrium. The desulfurization activity and denitrogenation activity of the catalyst were determined from the measurments of the sulfur and nitrogen contents in the sample oil and product oil. The reaction conditions and the sulfur and nitrogen contents of the product oil are shown in Table 1.

Example 1

3 liters of pure water were heated to 70° C., and 220 g of sodium aluminate were dissolved therein to prepare an aqueous solution of sodium aluminate having a pH of about 12. Next, a solution of nitric acid was added over 25 minutes to adjust the pH of the solution to the desired pH (8.8–9.2). It was then aged at a temperature of 70° C. for 0.5 hours to prepare an aqueous solution containing a precipitate (gel) of alumina hydrate. Next, an aqueous solution of sodium silicate (No. 3 water glass 49 g, pure water 200 g) was added over 21 minutes, where necessary adding nitric acid solution to adjust and maintain the pH of the obtained aqueous solution to about 9. This was then aged at a temperature of about 70° C. for 0.5 hours to prepare a slurry liquid containing precipitate particles having a silica hydrate deposited on the surface of the alumina hydrate gel. This slurry liquid was then filtered and washed with an aqueous solution of ammonium carbonate until the sodium concentration in the filtrate was no more than 5 ppm to prepare a cake-shaped silica-alumina carrier. This cake-shaped silica-alumina carrier was then kneaded in a kneader at 80° C. whilst drying until the amount of water reached a level where moulding became possible, and then shaped into cylindrical pellets of 1.5 mm diameter using an extrusion moulder. The moulded pellets were then dried at 120° C. for 16 hours and then calcined at 700° C. for 3 hours to prepare the carrier. The results of subjecting the carrier to $^{29}$Si-nuclear magnetic resonance analysis are shown in Table 2.

Next, the silica-alumina carrier was impregnated with separately prepared aqueous solutions of cobalt nitrate (cobalt solution) and nickel nitrate (nickel solution) to give CoO and NiO contents of 4% by weight and 1% by weight, respectively. The impregnated carrier was then dried at 120° C. and then calcined at 450° C. to prepare a silica-alumina carrier loaded with cobalt and nickel. Next, the carrier thus prepared in advance (i.e. the carrier loaded with nickel and cobalt) was impregnated with a separately prepared aqueous solution of ammonium paramolybdate (molybdenum solution) to give a MoO$_3$ content of 16% by weight. It was dried at 120° C. and then calcined at 500° C. to prepare catalyst A. The silica content in catalyst A was 12.2% by weight.

Next, a hydrotreatment test using sample oil A and catalyst A was carried out to determine the desulfurization activity and denitrogenation activity of catalyst A. The physical properties (chemical composition, specific surface area, pore volume, $^{29}$Si-nuclear magnetic resonance analysis) of catalyst A and the results of the hydrotreatment test are shown in Table 2.

TABLE 2

| | EXAMPLES | | | |
|---|---|---|---|---|
| | 1 | 2 | 3 | 4 |
| Catalyst | A | B | C | D |
| (1) Silica content in carrier (wt. %) | 12.2 | 16.4 | 16.5 | 8.3 |
| (2) $^{29}$Si-NMR analysis | | | | |
| area proportion of −80 ppm peak (%) *1 | 21.6 | 14.2 | 13.1 | 27.0 |
| combined area proportion of −80, −86 and −92 ppm peaks (%) *1 | 48.3 | 28.5 | 39.1 | 50.7 |
| (2)' $^{29}$Si-NMR analysis of carrier | | | | |
| area proportion of −80 ppm peak (%) *1 | 34.9 | 26. 1 | 24.9 | 38.4 |
| combined area proportion of −80, −86 and −92 ppm peaks (%) *1 | 86.4 | 57.2 | 76.7 | 87.7 |
| (3) Hydrogenation-active metal components (wt. %) *2 | | | | |
| MoO$_3$ | 16 | 16 | 16 | 16 |
| CoO | 3.9 | 3.9 | 3.8 | 4.2 |
| NiO | 0.9 | 1.1 | 0.9 | 1.0 |
| (4) Pore structure | | | | |
| PV$_{(0-300)}$ (ml/g) *3 | 0.47 | 0.48 | 0.44 | 0.47 |
| (5) Specific surface area (m$^2$/g) | 263 | 255 | 252 | 280 |
| Hydrotreatment test | | | | |
| (1) HDS/HDN (%) *4 | 133/130 | 123/132 | 119/140 | 116/106 |

*1: Proportion with respect to area of all peaks
*2: Content of active component in catalyst in terms of oxide
*3: Pore volume occupied by pores having a pore diameter in the range of 0 to 300 Angstroms (nitrogen adsorption method)
*4: Relative value with respect to HDS (desulfurization rate)/HDN (denitrogenation rate) of Comparative Example 3 (Table 3).

Comparative Example 1

A catalyst a was prepared in exactly the same way as Example 1 except that an aqueous solution of sodium silicate (49 g No. 3 water glass, 200 g pure water) was added within 5 minutes instead of the step of adding the sodium silicate solution (No.3 water glass 49 g, pure water 200 g) over a period of 21 minutes. The silica content in the catalyst a was 12.5% by weight. Next, hydrotreatment of A sample oil was carried out using catalyst A to test the desulfurization activity and denitrogenation activity of catalyst A. The physical properties of catalyst A(chemical composition, specific surface area, pore volume, $^{29}$Si-nuclear magnetic resonance analysis) and the results of the hydrotreatment test are shown in Table 3.

TABLE 3

| | COMPARATIVE EXAMPLES | | |
|---|---|---|---|
| | 1 | 2 | 3 |
| Catalyst | A | b | c |
| (1) Silica content in carrier (wt. %) | 12.5 | 16.8 | 8.2 |
| (2) $^{29}$Si-NMR analysis | | | |
| area proportion of −80 ppm peak (%) *1 | 7.4 | 4.6 | 12.2 |
| combined area proportion of −80, −86 and −92 ppm peaks (%) *1 | 18.9 | 12.1 | 18.0 |
| (2)' $^{29}$Si-NMR analysis of carrier | | | |
| area proportion of −80 ppm peak (%) *1 | 8.9 | 3.9 | 25.8 |
| combined area proportion of −80, −86 and −92 ppm peaks (%) *1 | 48.4 | 41.0 | 50.6 |
| (3) Hydrogenation-active metal components (wt. %) *2 | | | |
| MoO$_3$ | 16.1 | 16.0 | 16.0 |
| CoO | 4.0 | 4.2 | 4.1 |
| NiO | 1.0 | 1.2 | 1.0 |
| (4) Pore structure | | | |
| PV$_{(0-300)}$ (ml/g) *3 | 0.44 | 0.41 | 0.47 |
| (5) Specific surface area (m$^2$/g) | 253 | 250 | 282 |
| Hydrotreatment test | | | |
| (1) HDS/HDN (%) *4 | 80/108 | 90/106 | 100/100 |

*1: Proportion with respect to area of all peaks
*2: Content of active component in catalyst in terms of oxide
*3: Pore volume occupied by pores having a pore diameter in the range of 0 to 300 Angstroms (nitrogen adsorption method)
*4: Relative value with respect to HDS (desulfurization rate)/HDN (denitrogenation rate) of Comparative Example 3 (Table 3).

Example 2

Catalyst B was prepared in the same way as Example 1 except that nitric acid solution was added over 24 minutes to adjust the pH to the desired pH (8.8–9.2) instead of the step of adding nitric acid solution over 25 minutes to adjust the pH to the desired pH (8.8–9.2), and that an aqueous solution of sodium silicate (No.3 water glass 69 g, pure water 200 g) was added over 20 minutes instead of the step of adding the aqueous solution of sodium silcate (No. 3 water glass 49 g, pure water 200 g) over 21 minutes. The silica content in catalyst B was 16.4% by weight . Hydrotreatment of sample A was carried out using catalyst B under the above-described hydrotreatment conditions to test the desulfurization and denitrogenation activity of catalyst B. The physical properties of catalyst B (chemical composition, specific surface area, pore volume, $^{29}$Si-nuclear magnetic resonance analysis) and the results of the hydrotreatment test are shown in Table 2.

Example 3

Catalyst C was prepared in the same way as Example 2 except that an aqueous solution of sodium silicate (No.3 water glass 69 g, pure water 200 g) was added over 33 minutes instead of the step of adding the aqueous solution of sodium silicate (No. 3 water glass 69 g, pure water 200 g) over 20 minutes. The silica content in catalyst C was 16.5% by weight. Next, hydrotreatment of a sample oil was carried out using catalyst C under the above-described hydrotreatment conditions to test the desulfurization and denitrogenation activity of catalyst C. The physical properties of catalyst C (chemical composition, specific surface area, pore volume, $^{29}$Si-nuclear magnetic resonance analysis) and the results of the hydrotreatment test are shown in Table 2.

Comparative Example 2

Catalyst b was prepared in the same way as Example 2 except that an aqueous solution of sodium silicate (No.3 water glass 69 g, pure water 200 g) was added within 10 minutes instead of the step of adding the aqueous solution of sodium silicate (No. 3 water glass 69 g, pure water 200 g) over 20 minutes. The silica content in catalyst b was 16.8% by weight. Next, hydrotreatment of a sample oil was carried out using catalyst b under the above-described hydrotreatment conditions to test the desulfurization and denitrogenation activity of catalyst b. The physical properties of catalyst b (chemical composition, specific surface area, pore volume, $^{29}$Si-nuclear magnetic resonance analysis) and the results of the hydrotreatment test are shown in Table 3.

Example 4

Catalyst D was prepared in the same way as Example 1 except that nitric acid solution was added over 20 minutes to adjust the pH to the desired pH (8.8–9.2) instead of the step of adding the nitric acid solution over 25 minutes to adjust the pH to the desired pH (8.8–9.2), and that an aqueous solution of sodium silicate (No.3 water glass 31 g, pure water 200 g) was added over 20 minutes instead of the step of adding the aqueous solution of sodium silcate (No. 3 water glass 49 g, pure water 200 g) over 21 minutes. The silica content in catalyst D was 8.3% by weight. Hydrotreatment of a sample oil was carried out using catalyst D under the above-described hydrotreatment conditions to test the desulfurization and denitrogenation activity of catalyst D. The physical properties of catalyst D (chemical composition, specific surface area, pore volume, $^{29}$Si-nuclear magnetic resonance analysis) and the results of the hydrotreatment test are shown in Table 2.

Comparative Example 3

Catalyst c was prepared in the same way as Example 4 except that an aqueous solution of sodium silicate (No.3 water glass 31 g, pure water 200 g) was added within 1 minute instead of the step of adding the aqueous solution of sodium silicate (No. 3 water glass 31 g, pure water 200 g) over 20 minutes. The silica content in catalyst c was 8.2% by weight. Next, hydrotreatment of a sample oil was carried out using catalyst c under the above-described hydrotreatment conditions to test the desulfulrization and denitrogenation activity of catalyst c. The physical properties of catalyst c (chemical composition, specific surface area, pore volume, $^{29}$Si-nuclear magnetic resonance analysis) and the results of the hydrotreatment test are shown in Table 3.

Example 5

Catalyst E having the properties shown in Table 4 was produced in the following manner.

3 liters of pure water was heated to 70° C. and 205 g of sodium aluminate was dissolved therein to prepare an aqueous solution of sodium aluminate having a pH of about 12. Next, nitric acid solution was added to this aqueous solution of sodium aluminate over a period of about 15 minutes to adjust the pH of the mixed solution to the desired pH (8.8–9.2). It was then aged for 0.5 hours at 70° C. to prepare an aqueous solution comprising an alumina hydrate gel precipitate.

To this aqueous solution was added within 10 minutes an aqueous solution of sodium silicate prepared by dissolving 32 g of No. 3 water glass in 200 g of pure water. It was then aged for 0.5 hours at a temperature of 70° C., where necessary adding nitric acid solution to keep the pH at about 9. In this way, a slurry liquid containing precipitate particles comprising silica hydrate precipitate (gel) deposited on the surface of the alumina hydrate precipitate (gel) was prepared. This slurry liquid was filtered and the resulting cake was washed with an aqueous solution of ammonium carbonate until the sodium concentration of the filter liquid after filtrate was no more than 5 ppm.

This cake-shaped silica-alumina was kneaded in a kneader at 80° C. whilst drying until the water content reached a level at which moulding became possible. It was then shaped into cylindrical pellets of 1.5 mm diameter using an extrusion moulding apparatus. The moulded pellets were dried for 16 hours at 120° C., and then calcined for 3 hours at 700° C. to prepare the carrier. This silica-alumina moulded body was impregnated with an aqueous solution of magnesium nitrate to give a MgO content in the magnesium-silica-alumina carrier after calcination of 1% by weight. It was then dried at 120° C. and calcined for 3 hours at 600° C. to prepare a magnesia-silica-alumina carrier.

This carrier was then impregnated with an aqueous solution of cobalt nitrate and nickel nitrate to give CoO and NiO contents of 3.8% by weight and 0.7% by weight, respectively. It was then dried at 120° C. and calcined at 450° C. Next, the carrier was impregnated with an aqueous solution of ammonium paramolybdate (molybdenum solution) to give an $MoO_3$ content of 16.6% by weight, followed by drying at 120° C. and calcination at 500° C. to obtain catalyst E.

Hydrotreatment of sample oil B was then carried out using catalyst E prepared in the manner described above to measure the desulfurization and denitrogenation activities of catalyst E. The pore structure and chemical composition of catalyst E as well as the results of the hydrotreatment test are shown in Table 4.

Example 6

Catalyst F was prepared in the same way as Example 5 except that the amount of the aqueous solution of magnesium nitrate was adjusted to give a MgO content in the carrier of 3% by weight. Sample oil B was then subjected to a hydrotreatment test using catalyst F. The pore structure and chemical composition of catalyst F as well as the results of the hydrotreatment test are shown in Table 4.

Example 7

Catalyst G was prepared in the same way as Example 5 except that the amount of the aqueous solution of magnesium nitrate was adjusted to give a magnesium content in the carrier of 5% by weight in terms of MgO. Sample oil B was then subjected to a hydrotreatment test using catalyst G. The pore structure and chemical composition of catalyst G as well as the results of the hydrotreatment test are shown in Table 4.

Example 8

Catalyst H was prepared in the same way as Example 5 except that the sodium silicate aqueous solution was prepared by dissolving 65 g of No. 3 water glass in 200 g of pure water and that the amount of the aqueous solution of magnesium nitrate was adjusted to give a MgO content in the carrier of 3% by weight. Sample oil B was then subjected to a hydrotreatment test using catalyst H. The pore structure and chemical composition of catalyst H as well as the results of the hydrotreatment test are shown in Table 4.

TABLE 4

|  | EXAMPLES | | | |
|---|---|---|---|---|
|  | 5 | 6 | 7 | 8 |
| Catalyst | E | F | G | H |
| (1) Carrier composition (wt. %) | | | | |
| MgO | 1.0 | 3.0 | 5.0 | 3.0 |
| $SiO_2$ | 10.9 | 10.6 | 10.4 | 19.4 |
| $Al_2O_3$ | 88.1 | 86.4 | 84.6 | 77.6 |
| (2) Active components in catalyst (wt. %) *1 | | | | |
| $MoO_3$ | 16.6 | 16.6 | 16.8 | 16.9 |
| CoO | 3.8 | 3.7 | 3.8 | 3.7 |
| NiO | 0.7 | 0.7 | 0.7 | 1.2 |
| (3) Pore structure | | | | |
| $PV_{(0-300)}$ ml/g | 0.431 | 0.417 | 0.395 | 0.468 |
| $PV_{(30-100)}/PV_{(0-150)}$ *2 | 0.71 | 0.78 | 0.72 | 0.58 |
| $PV_{(150-300)}/PV_{(0-300)}$ *2 | 0.12 | 0.14 | 0.13 | 0.25 |
| $PV_{(0-300)}/PV_{(\geq 40)}$ *3 | 0.86 | 0.83 | 0.84 | 0.92 |
| (4) Specific surface area ($m^2/g$) | 270 | 244 | 267 | 248 |
| Hydrotreatment test *4 | | | | |
| (1) HDS/HDN (%) | 108/107 | 120/113 | 118/102 | 114(130)/117(115) *5 |

*1: Content of active component in the carrier in terms of the oxide.
*2: Pore volume ratio according to the nitrogen adsorption method. $PV_{(n-m)}$ refers to the pore volume occupied by pores having a pore diameter in the range of n to m Angstroms.
*3: Ratio of the pore volume ($PV_{(0-300)}$) according to the nitrogen adsorption method, and the pore volume ($PV_{(\geq 40)}$) according to the mercury porosimetry method.
*4: Relative values with respect to the desulfurization and denitrogenation activities of catalyst d (Comparative Example 4).
*5: ( ) are the relative values with respect to the desulfurization and denitrogenation activity of catalyst g (Comparative Example 7). They represent the activity of a catalyst having the same $SiO_2$ content (20 wt. %) since the amount of $SiO_2$ in the carrier is one factor which affects the activity.

Comparative Example 4

Catalyst d was prepared in the same way as Example 5 except that there was no addition of the aqueous solution of magnesium nitrate. Sample oil B was then subjected to a hydrotreatment test using catalyst d. The pore structure and chemical composition of catalyst d as well as the results of the hydrotreatment test are shown in Table 5.

Comparative Example 5

Catalyst e was prepared in the same way as Example 8 except that there was no addition of the aqueous solution of magnesium nitrate. Sample oil B was then subjected to a hydrotreatment test using catalyst e. The pore structure and chemical composition of catalyst e as well as the results of the hydrotreatment test are shown in Table 5.

Comparative Example 6

Catalyst f was prepared in the same way as Example 5 except that (i) the time taken to adjust the pH by adding the nitric acid solution to the sodium aluminate aqueous solution when preparing the aqueous solution containing the alumina hydrate precipitate (gel) was within about 2 minutes; (ii) the pH was set to between 9.6 and 9.8; and (iii) the amount of magnesium nitrate aqueous solution added was adjusted to give an MgO content of 3% by weight. Sample oil B was then subjected to a hydrotreatment test using catalyst f. The pore structure and chemical composition of catalyst f as well as the results of the hydrotreatment test are shown in Table 5.

Comparative Example 7

Catalyst g was prepared in the same way as Example 5 except that (i) the time taken to adjust the pH by adding the nitric acid solution to the sodium aluminate aqueous solution when preparing the aqueous solution containing the alumina hydrate precipitate (gel) was within about 1 minute; (ii) the pH was set to between 10.0 and 10.4; and (iii) the amount of magnesium nitrate aqueous solution added was adjusted to give an MgO content of 3% by weight. A sample oil was then subjected to a hydrotreatment test using catalyst g. The pore structure and chemical composition of catalyst g as well as the results of the hydrotreatment test are shown in Table 5.

TABLE 5

|  | COMPARATIVE EXAMPLES | | | |
|---|---|---|---|---|
|  | 4 | 5 | 6 | 7 |
| Catalyst | d | e | f | g |
| (1) Carrier composition (wt. %) | | | | |
| MgO | 0 | 0 | 3.0 | 3.0 |
| $SiO_2$ | 11.0 | 20.0 | 10.7 | 10.6 |
| $Al_2O_3$ | 89.0 | 80.0 | 86.3 | 86.4 |
| (2) Active components in catalyst (wt. %) *1 | | | | |
| $MoO_3$ | 16.8 | 16.8 | 16.8 | 16.8 |
| CoO | 3.8 | 4.1 | 3.8 | 3.8 |
| NiO | 0.7 | 0.9 | 0.7 | 0.7 |
| (3) Pore structure | | | | |
| $PV_{(0-300)}$ ml/g | 0.471 | 0.524 | 0.554 | 0.501 |
| $PV_{(30-100)}/PV_{(0-150)}$ *2 | 0.81 | 0.58 | 0.44 | 0.60 |
| $PV_{(150-300)}/PV_{(0-300)}$ *2 | 0.11 | 0.27 | 0.28 | 0.26 |
| $PV_{(0-300)}/PV_{(\geq 40)}$ *3 | 0.71 | 0.97 | 0.95 | 0.67 |
| (4) Specific surface area ($m^2/g$) | 293 | 259 | 252 | 210 |
| Hydrotreatment test *4 | | | | |
| (1) HDS/HDN (%) | 100/100 | 88/102 | 86/85 | 82/79 |

*1: Content of active component in the carrier in terms of the oxide.
*2: Pore volume ratio according to the nitrogen adsorption method. $PV_{(n-m)}$ refers to the pore volume occupied by pores having a pore diameter in the range of n to m Angstroms.
*3: Ratio of the pore volume ($PV_{(0-300)}$) according to the nitrogen adsorption method, and the pore volume ($PV_{(\geq 40)}$) according to the mercury porosimetry method.
*4: Relative values with respect to the HDS (desulfurization rate) and HDN (denitrogenation rate) of catalyst d (Comparative Example 4).

Example 9

Catalyst I having the properties shown in Table 6 was produced in the following manner.

3 liters of pure water was heated to 70° C. and 205 g of sodium aluminate was dissolved therein to prepare an aqueous solution of sodium aluminate having a pH of about 12. Next, nitric acid solution was added to this aqueous solution of sodium aluminate over a period of about 15 minutes to adjust the pH of the mixed solution to the desired pH (8.8–9.2). It was then aged for 0.5 hours at 70° C. to prepare an aqueous solution comprising an alumina hydrate gel precipitate.

To this aqueous solution was added within 10 minutes an aqueous solution of sodium silicate prepared by dissolving 32 g of No. 3 water glass in 200 g of pure water. It was then aged for 0.5 hours at a temperature of 70° C., where necessary adding nitric acid solution to keep the pH at about 9. In this way, a slurry liquid containing precipiate particles having silica hydrate precipitate (gel) deposited on the surface of the alumina hydrate precipitate (gel) was prepared. This slurry liquid was filtered and the resulting cake was washed with an aqueous solution of ammonium carbonate until the sodium concentration of the filtrate after filtering was no more than 5 ppm.

An aqueous solution of boric acid was added to this cake to give a $B_2O_3$ content of 1% by weight. It was then kneaded in a kneader at 80° C. whilst drying until the water content reaches a level at which moulding became possible. It was then shaped into cylindrical pellets of 1.5 mm diameter using an extrusion moulding apparatus. The moulded pellets were dried for 16 hours at 120° C., and then calcined for 3 hours at 700° C. to prepare the carrier. This carrier was impregnated with an aqueous solution of cobalt nitrate and nickel nitrate to give CoO and NiO contents of 4% by weight and 1% by weight, respectively. It was then dried at 120° C. and calcined at 450° C. Next, it was impregnated with an aqueous solution of ammonium paramolybdate (molybdenum solution) to give a MoO3 content of 14.8% by weight, followed by drying at 120° C. and calcination at 500° C. to produce catalyst I.

Hydrotreatment of sample oil B was then carried out using catalyst I prepared in the manner described above to measure the desulfurization and denitrogenation activities of catalyst I. The pore structure and chemical composition of catalyst I as well as the results of the hydrotreatment test are shown in Table 6.

Example 10

Catalyst J was prepared in the same manner as Example 9 except that the amount of boric acid solution added was adjusted to give a boria content of 3% by weight in terms of $B_2O_3$. A hydrotreatment test was carried out on sample oil B using catalyst J. The pore structure and the chemical composition of catalyst J as well as the results of the hydrotreatment test are shown in Table 6.

Example 11

Catalyst K was prepared in the same manner as Example 9 except that the amount of boric acid solution added was adjusted to give a boria content of 7% by weight in terms of $B_2O_3$. A hydrotreatment test was carried out on sample oil B using catalyst K. The pore structure and the chemical composition of catalyst K as well as the results of the hydrotreatment test are shown in Table 6.

Example 12

Catalyst L was prepared in the same manner as Example 9 except that the amount of No. 3 water glass was 65 g instead of 32 g. A hydrotreatment test was carried out on sample oil B using catalyst L. The pore structure and the chemical composition of catalyst L as well as the results of the hydrotreatment test are shown in Table 6.

TABLE 6

| | EXAMPLES | | | |
|---|---|---|---|---|
| | 9 | 10 | 11 | 12 |
| Catalyst | I | J | K | L |
| (1) Carrier composition (wt. %) | | | | |
| Boria | 1 | 3 | 7 | 1 |
| Silica | 11 | 11 | 11 | 20 |
| Alumina | 88 | 86 | 82 | 79 |
| (2) Active components in catalyst (wt. %) *1 | | | | |
| MoO3 | 14.8 | 15.0 | 15.1 | 14.7 |
| CoO | 4.0 | 4.0 | 4.0 | 4.2 |
| NiO | 1.0 | 1.0 | 1.0 | 0.9 |
| (3) Pore structure | | | | |
| $PV_{(0-300)}$ ml/g | 0.431 | 0.431 | 0.417 | 0.471 |
| $PV_{(30-100)}/PV_{(0-150)}$ *2 | 0.72 | 0.74 | 0.74 | 0.61 |
| $PV_{(150-300)}/PV_{(0-300)}$ *2 | 0.15 | 0.15 | 0.15 | 0.22 |
| $PV_{(0-300)}/PV_{(\geq 40)}$ *3 | 0.88 | 0.89 | 0.87 | 0.98 |
| (4) Specific surface area (m²/g) | 270 | 255 | 229 | 247 |
| Hydrotreatment test *4 | | | | |
| (1) HDS/HDN (%) | 115/137 | 121/156 | 116/153 | 107/147 |

*1: Content of active component in the carrier in terms of the oxide.
*2: Pore volume ratio according to the nitrogen adsorption method. $PV_{(n-m)}$ refers to the pore volume occupied by pores having a pore diameter in the range of n to m Angstroms.
*3: Ratio of the pore volume ($PV_{(0-300)}$) according to the nitrogen adsorption method, and the pore volume ($PV_{(\geq 40)}$) according to the mercury porosimetry method.
*4: Relative values with respect to the HDS (desulfurization rate) and HDN (denitrogenation rate) of Comparative Example 8 (Table 7).

Comparative Example 8

Catalyst h was prepared in the same manner as Example 9 except that boric acid was not used. A hydrotreatment test was carried out on sample oil B using catalyst h. The pore structure and the chemical composition of catalyst h as well as the results of the hydrotreatment test are shown in Table 7.

Comparative Example 9

Catalyst i was prepared in the same manner as Example 12 except that boric acid was not used. A hydrotreatment test was carried out on sample oil B using catalyst i. The pore structure and the chemical composition of catalyst i as well as the results of the hydrotreatment test are shown in Table 7.

Comparative Example 10

Catalyst j was prepared in the same manner as Example 9 except that the amount of boric acid aqueous solution added was adjusted to give a boria content of 15% by weight in terms of $B_2O_3$. A hydrotreatment test was carried out on sample oil B using catalyst j. The pore structure and the chemical composition of catalyst j as well as the results of the hydrotreatment test are shown in Table 7.

Comparative Example 11

Catalyst k was prepared in the same manner as Example 9 except that the time taken to adjust the pH by adding nitric acid solution to the sodium aluminate aqueous solution when preparing the aqueous solution containing alumina hydrate precipitate (gel) was within about 2 minutes, and that the pH was set to 9.6–9.8. A hydrotreatment test was carried out on sample oil B using catalyst k. The pore structure and the chemical composition of catalyst k as well as the results of the hydrotreatment test are shown in Table 7.

Comparative Example 12

Catalyst 1 was prepared in the same manner as Example 9 except that the time taken to adjust the pH by adding nitric acid solution to the sodium aluminate aqueous solution when preparing the aqueous solution containing alumina hydrate precipitate (gel) was within about 1 minute, and that the pH was set to 10.0–10.4. A hydrotreatment test was carried out on sample oil B using catalyst 1. The pore structure and the chemical composition of catalyst 1 as well as the results of the hydrotreatment test are shown in Table 7.

TABLE 7

| | COMPARATIVE EXAMPLES | | | | |
|---|---|---|---|---|---|
| | 8 | 9 | 10 | 11 | 12 |
| Catalyst | h | i | j | k | l |
| (1) Carrier composition (wt. %) | | | | | |
| Boria | 0 | 0 | 15 | 1 | 1 |
| Silica | 11 | 20 | 11 | 11 | 11 |
| Alumina | 89 | 80 | 74 | 88 | 88 |
| (2) Active components in catalyst (wt. %) *1 | | | | | |
| $MoO_3$ | 15.0 | 14.8 | 15.2 | 14.9 | 15.2 |
| CoO | 4.0 | 4.3 | 3.9 | 4.2 | 4.2 |
| NiO | 0.9 | 1.0 | 1.1 | 1.1 | 1.0 |
| (3) Pore structure | | | | | |
| $PV_{(0-300)}$ ml/g | 0.479 | 0.539 | 0.410 | 0.568 | 0.486 |
| $PV_{(30-100)}/PV_{(0-150)}$ *2 | 0.81 | 0.58 | 0.73 | 0.46 | 0.54 |
| $PV_{(150-300)}/PV_{(0-300)}$ *2 | 0.11 | 0.26 | 0.16 | 0.28 | 0.24 |
| $PV_{(0-300)}/PV_{(\geq 40)}$ *3 | 0.71 | 0.97 | 0.86 | 0.96 | 0.66 |
| (4) Specific surface area ($m^2/g$) | 293 | 258 | 218 | 248 | 206 |
| Hydrotreatment test *4 | | | | | |
| (1) HDS/HDN % *4 | 100/100 | 100/120 | 92/85 | 83/88 | 76/85 |

*1: Content of active component in the carrier in terms of the oxide.
*2: Pore volume ratio according to the nitrogen adsorption method. $PV_{(n-m)}$ refers to the pore volume occupied by pores having a pore diameter in the range of n to m Angstroms.
*3: Ratio of the pore volume ($PV_{(0-300)}$) according to the nitrogen adsorption method, and the pore volume ($PV_{(\geq 40)}$) according to the mercury porosimetry method.
*4: Relative values with respect to the HDS (desulfurization rate) and HDN (denitrogenation rate) of Comparative Example 8 (Table 7).

Effect of the Invention

As specifically described in detail above, the present invention provides a hydrotreating catalyst comprising a silica-alumina carrier loaded with at least one or two or more types of hydrogenation-active metal components selected from the group consisting of the elements of Group VI and Group VIII of the Periodic Table, wherein (1) the silica content is in the range of 5 to 40% by weight based on the total weight of the carrier; (2) in the spectrum obtained by $^{29}$Si-nuclear magnetic resonance analysis ($^{29}$Si-NMR), (i) the area of the peak at –80 ppm is 10% or more of the combined area of all peaks, and (ii) the combined area of the peaks at –80 ppm, –86 ppm and –92 ppm is 20% or more of the combined area of all peaks; or a hydrotreating catalyst comprising silica-alumina and a third component such as an alkaline earth metal or boria, loaded with at least one type or two or more types of hydrogenation-active metal components selected from the group consisting of the elements of Group VI and Group VIII of the Periodic Table, and having a specific pore structure. It also provides a method of hydrotreating a hydrocarbon oil characterised by contacting a hydrocarbon oil with hydrogen in the presence of said hydrotreating catalyst to effect a high degree of desulfurization and denitrogenation thereof. The use of this kind of hydrotreating catalyst makes it possible to hydrotreat hydrocarbon oils such as straight run gas oils, vacuum gas oils, cracked gas oils, light cycle gas oils, and heavy cycle gas oils with a high degree of desulfurization and a high degree of denitrogenation, and to carry out treatments such as hydrocracking, hydrodearomatization and hydrofining to a high degree.

Industrial Applicability of the Invention

The present invention provides a hydrotreating catalyst comprising a silica-alumina carrier having a high silica dispersion as a structural component, in which hydrogenation-active metal components are highly dispersed and having specific pore characteristics; and a method of hydrotreating a hydrocarbon oil using such catalyst. It is, for example, used for the hydrodesulfurization, hydrodenitrogenation, hydrocracking and hydrodearomatization of distillates and residual oils from the atmospheric and vacuum distillation of crude oil and distillates from cracking apparatus.

The hydrotreating catalyst of the present invention is particularly effective for the deep desulfurization of gas oil fractions as a result of its excellent denitrogenation activity and desulfurization activity, and represents an extremely large contribution to environmental conservation.

What is claimed is:

1. A hydrotreating catalyst comprising a carrier comprising silica and alumina loaded with at least one type of hydrogenation-active metal component;
   wherein said carrier is made by adding a silica compound to an alumina compound over a time interval of 20 to 33 minutes and;
   the obtained hydrogenation catalyst comprises the following physical properties:
   (1) the silica content is in the range of 2 to 40% by weight based on the total weight of the carrier;
   (2) in the spectrum obtained by nuclear magnetic resonance analysis ($^{29}$Si-NMR),
       (i) the area of the peak at –80 ppm is 10% or more of the combined area of all the peaks; and
       (ii) the combined area of peaks at –80 ppm, –86 ppm and –92 ppm is 20% or more of the combined area of all peaks.

2. The hydrotreating catalyst according to claim 1 wherein in the spectrum obtained by nuclear magnetic resonance analysis ($^{29}$Si-NMR), (i) said area of the peak at –80 ppm is 12% or more of the combined area of all peaks, and (ii) said combined area of peaks at –80 ppm, –86 ppm and –92 ppm is 25% or more of the combined area of all peaks.

3. The hydrotreating catalyst according to claim 1 wherein said carrier further comprises a third component.

4. The hydrotreating catalyst according to claim 3 wherein said third component is at least one oxide selected from the group consisting of alkali metal oxides, alkaline earth metal oxides, boria, zirconia, titania, thoria and phosphorous oxide.

5. The hydrotreating catalyst according to claim 3 or claim 4 wherein the content of said third component is in the range of 1 to 10% by weight based on the total weight of the catalyst carrier.

6. The hydrotreating catalyst according to claim 4 wherein the content of said third component is in the range of 0.5 to 7% by weight based on the total weight of the catalyst carrier.

7. The hydrotreating catalyst according to claim 1 wherein said hydrogenation-active metal component comprises at least one active component selected from the group consisting of the elements of Group VI and Group VIII of the Periodic Table.

8. The hydrotreating catalyst according to claim 1, wherein said hydrogenation-active metal component comprises at least one active component selected from the group consisting of the elements of Group VI of the Periodic Table and at least one active component selected from the group consisting of the elements of Group VIII of the Periodic Table.

9. A method of hydrotreating a hydrocarbon oil comprising contacting a hydrocarbon oil with hydrogen under hydrotreatment conditions and in the presence of a hydrotreating catalyst according to claim 1.

10. The method of hydrotreating a hydrocarbon oil according to claim 9 wherein the hydrotreatment conditions comprise a reaction temperature in the range of 200 to 500° C., a reaction pressure in the range of 1 to 200 kg/cm$^2$, a hydrogen-containing gas rate in the range of 100 to 270 l/l and a liquid hourly space velocity in the range of 0.05 to 5 V/H/V.

11. The method of hydrotreating a hydrocarbon oil according to claim 9 or claim 10 wherein said hydrocarbon oil is a gas oil fraction containing sulfur compounds and nitrogen compounds.

12. The hydrotreating catalyst of claim 1 wherein said carrier is made by adding said silica compound to said alumina compound over a time interval of 20 to 24 minutes.

13. The hydrotreating catalyst of claim 1 wherein said carrier is made by adding said silica compound to said alumina compound over a time interval of 20 to 21 minutes.

14. The hydrotreating catalyst of claim 3 wherein said third component is at least one oxide selected from the group consisting magnesium oxide and boria.

15. A method of preparing a hydrotreating catalyst comprising a carrier comprising silica and alumina loaded with at least one type of hydrogenation-active metal component comprising the steps of:

adding an alumina compound to a reaction vessel,
adding a silica compound to said alumina compound in a time interval of 20 to 33 minutes to obtain a reaction mixture; wherein
(1) the silica content is in the range of 2 to 40% by weight based on the total weight of the carrier;
(2) in the spectrum obtained by nuclear magnetic resonance analysis ($^{29}$Si-NMR),
  (i) the area of the peak at −80 ppm is 10% or more of the combined area of all the peaks; and
  (ii) the combined area of peaks at −80 ppm, −86 ppm and −92 ppm is 20% or more of the combined area of all the peaks.

16. The method of claim 15 wherein in the spectrum obtained by nuclear magnetic resonance analysis ($^{29}$Si-NMR),
  (i) said area of the peak at −80 ppm is 12% or more of the combined area of all peaks, and
  (ii) said combined area of peaks at −80 ppm, −86 ppm and −92 ppm is 25% or more of the combined area of all peaks.

17. The method of claim 15 wherein said carrier further comprises a third component.

18. The method of claim 17 wherein said third component is at least one oxide selected from the group consisting of alkali metal oxides, alkaline earth metal oxides, boria, zirconia, titania, thoria and phosphorous oxide.

19. The method of claim 17 or 18 wherein the content of the third component is in the range of 1 to 10% by weight based on the total weight of the catalyst carrier.

20. The hydrotreating catalyst of claim 15 wherein said silica compound is added to said alumina compound over a time interval of 20 to 24 minutes.

21. The hydrotreating catalyst of claim 15 wherein said silica compound is added to said alumina compound over a time interval of 20 to 21 minutes.

22. The hydrotreating catalyst of claim 18 wherein said third component is at least one oxide selected from the group consisting magnesium and boria.

* * * * *